(12) United States Patent
Huang

(10) Patent No.: US 11,577,660 B1
(45) Date of Patent: Feb. 14, 2023

(54) VEHICLE CARRIER

(71) Applicant: YOTTA INNOVATION CO., LTD., Apia (WS)

(72) Inventor: Stella Huang, Taipei (TW)

(73) Assignee: YOTTA INNOVATION CO., LTD., Apia (WS)

( * ) Notice: Subject to any disclaimer, the term of this patent is extended or adjusted under 35 U.S.C. 154(b) by 0 days.

(21) Appl. No.: 17/407,937

(22) Filed: Aug. 20, 2021

(51) Int. Cl.
   *B60R 9/10* (2006.01)
   *B60R 9/06* (2006.01)

(52) U.S. Cl.
   CPC . *B60R 9/10* (2013.01); *B60R 9/06* (2013.01)

(58) Field of Classification Search
   CPC .................................. B60R 9/10; B60R 9/06
   USPC ................................................. 414/462–466
   See application file for complete search history.

(56) References Cited

U.S. PATENT DOCUMENTS

| | | | | |
|---|---|---|---|---|
| 4,275,981 A * | 6/1981 | Bruhn | ....................... | B60R 9/06 224/42.13 |
| 10,093,243 B2 * | 10/2018 | Shen | ........................ | B60R 9/10 |
| 10,315,584 B2 * | 6/2019 | Kuhlbach | ................ | B60R 9/10 |
| 11,383,652 B1 * | 7/2022 | Huang | ...................... | B60R 9/10 |
| 2015/0086313 A1 * | 3/2015 | Perez | ........................ | B60R 9/10 414/537 |

* cited by examiner

*Primary Examiner* — Lynn E Schwenning
(74) *Attorney, Agent, or Firm* — Muncy, Geissler, Olds & Lowe, P.C.

(57) ABSTRACT

A vehicle carrier is provided, including: a hanging assembly and at least one carrying assembly. The hanging assembly includes a first engaging portion. The at least one carrying assembly is rotatably and transversely disposed on the hanging assembly and includes a frame configured for a vehicle to be disposed thereon, a movable rod and a second engaging portion connected with the movable rod. The movable rod is movable in a longitudinal direction of the frame to drive the second engaging portion to move relative to the first engaging portion between a locking position and a release position. When the movable rod is axially moved relative to the frame and drives the second engaging portion to move from the locking position to the release position, the frame is swingable relative to the hanging assembly between a carrying position and an inclined position.

9 Claims, 8 Drawing Sheets

VEHICLE CARRIER

BACKGROUND OF THE INVENTION

Field of the Invention

The present invention relates to a vehicle carrier.

Description of the Prior Art

A conventional vehicle carrier is used to carry bicycles, electric bicycles and electric scooters, or the like. In operation, an operator has to directly move the cycle onto or from the vehicle carrier. If the cycle is heavy, a supporting board is used to connect the vehicle carriers with the ground so that the cycle can be pushed onto the vehicle carrier by the supporting board, which is laborsaving.

However, the supporting board is directly leaned against the vehicle carrier without positioning mechanism, which has poor assembling stability, and the supporting board is inconvenient to use and storage. Therefore, a vehicle carrier with a stretchable carrying frame is developed. The carrying frame includes a fixed frame and a supporting frame stretchably received within the fixed frame, and the supporting frame is swung relative to the fixed frame so as to upload the vehicle. However, when the vehicle is pushed to a corner that the fixed frame connected with the supporting frame, the vehicle is still required to be pushed with great exertion, which may cause the vehicle to displace and fall down due to the weight of the vehicle or incorrect direction of exertion. In addition, the corner has a poor structural strength and components disposed thereon are easily damaged.

The present invention is, therefore, arisen to obviate or at least mitigate the above-mentioned disadvantages.

SUMMARY OF THE INVENTION

The main object of the present invention is to provide a vehicle carrier, which is easy to operate, laborsaving and durable.

To achieve the above and other objects, the present invention provides a vehicle carrier, including: a hanging assembly and at least one carrying assembly. The hanging assembly is configured to be detachably connected with a hanging mechanism of a mobile and includes a first engaging portion. The at least one carrying assembly is rotatably and transversely disposed on the hanging assembly and includes a frame configured for a vehicle to be disposed thereon, a movable rod and a second engaging portion connected with the movable rod. The movable rod is movable in a longitudinal direction of the frame to drive the second engaging portion to move relative to the first engaging portion between a locking position and a release position. When the second engaging portion is in the locking position, the frame is in a carrying position and is non-swingable relative to the hanging assembly. When the movable rod is axially moved relative to the frame and drives the second engaging portion to move to the release position, the frame is swingable relative to the hanging assembly to an inclined position.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Please refer to FIGS. 1 to 9 for a preferable embodiment of the present invention. A vehicle carrier of the present invention includes a hanging assembly 10 and at least one carrying assembly 20.

Figure 1:
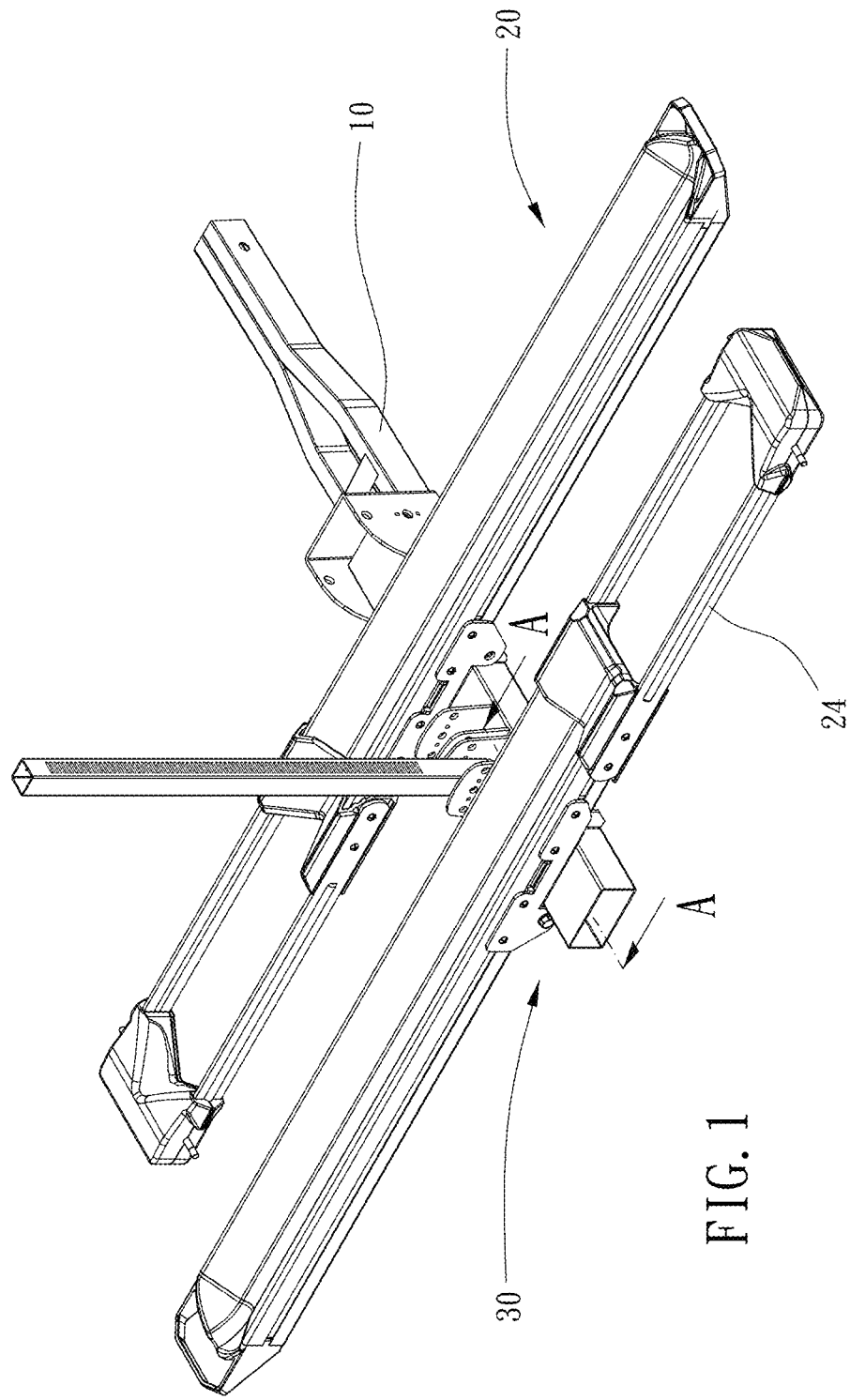
FIG. 1 is a stereogram showing a frame being in a carrying position according to a preferable embodiment of the present invention.
Figure 2:
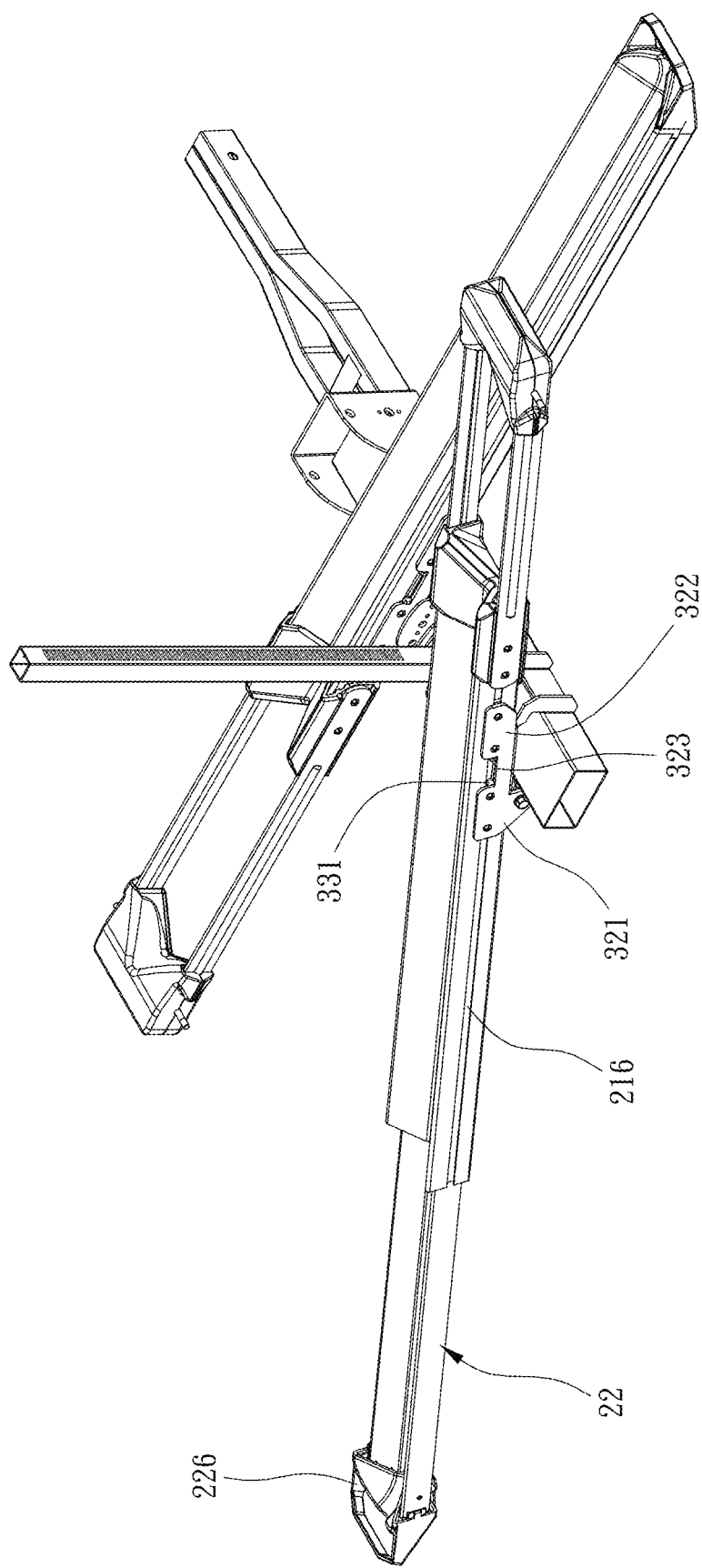
FIG. 2 is a stereogram showing the frame being in an inclined position according to a preferable embodiment of the present invention.
Figure 3:
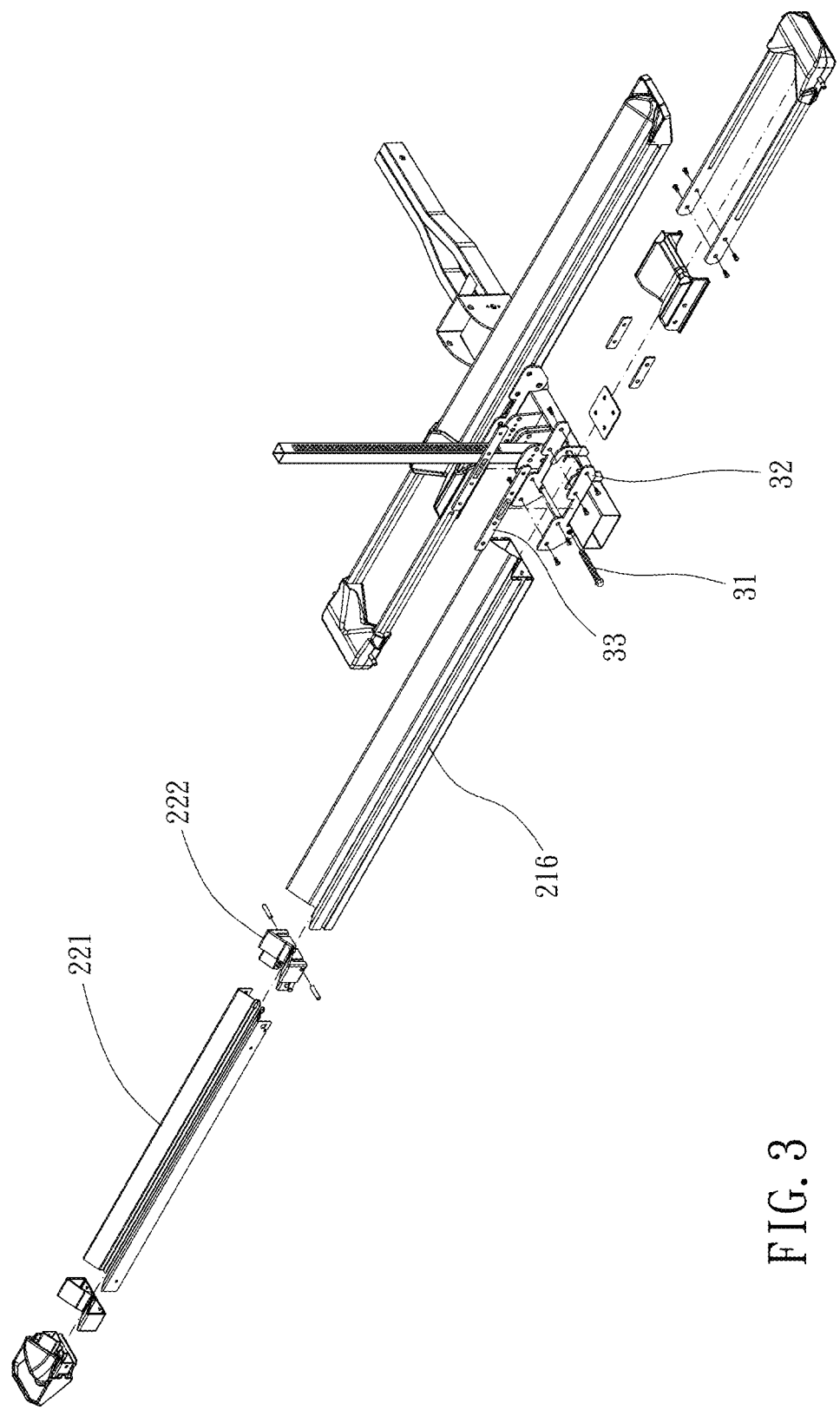
FIG. 3 is a partial breakdown drawing of FIG. 1.
Figure 5:
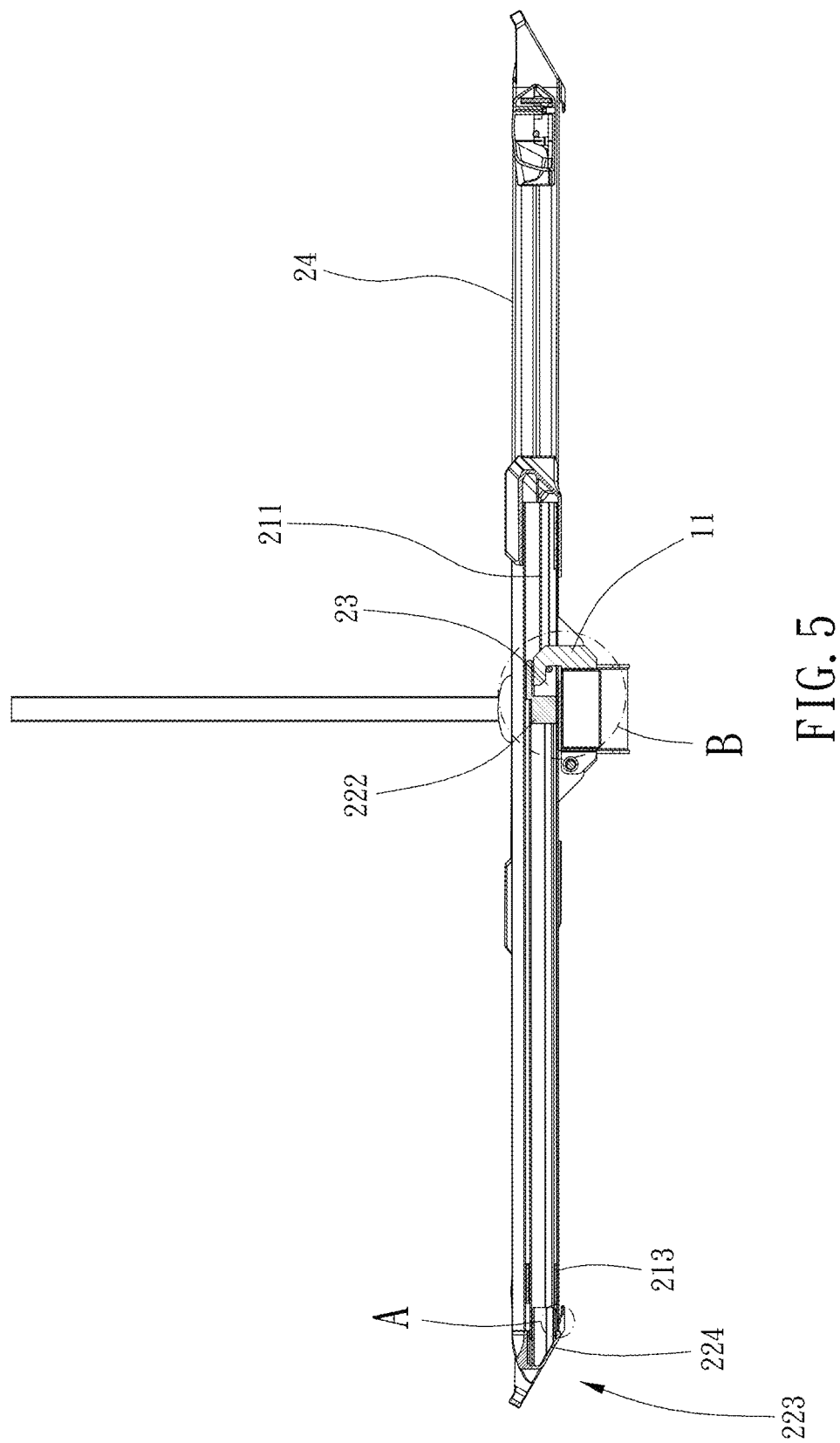
FIGS. 5 and 6 are cross-sectional views showing operation according to a preferable embodiment of the present invention.
Figure 6:
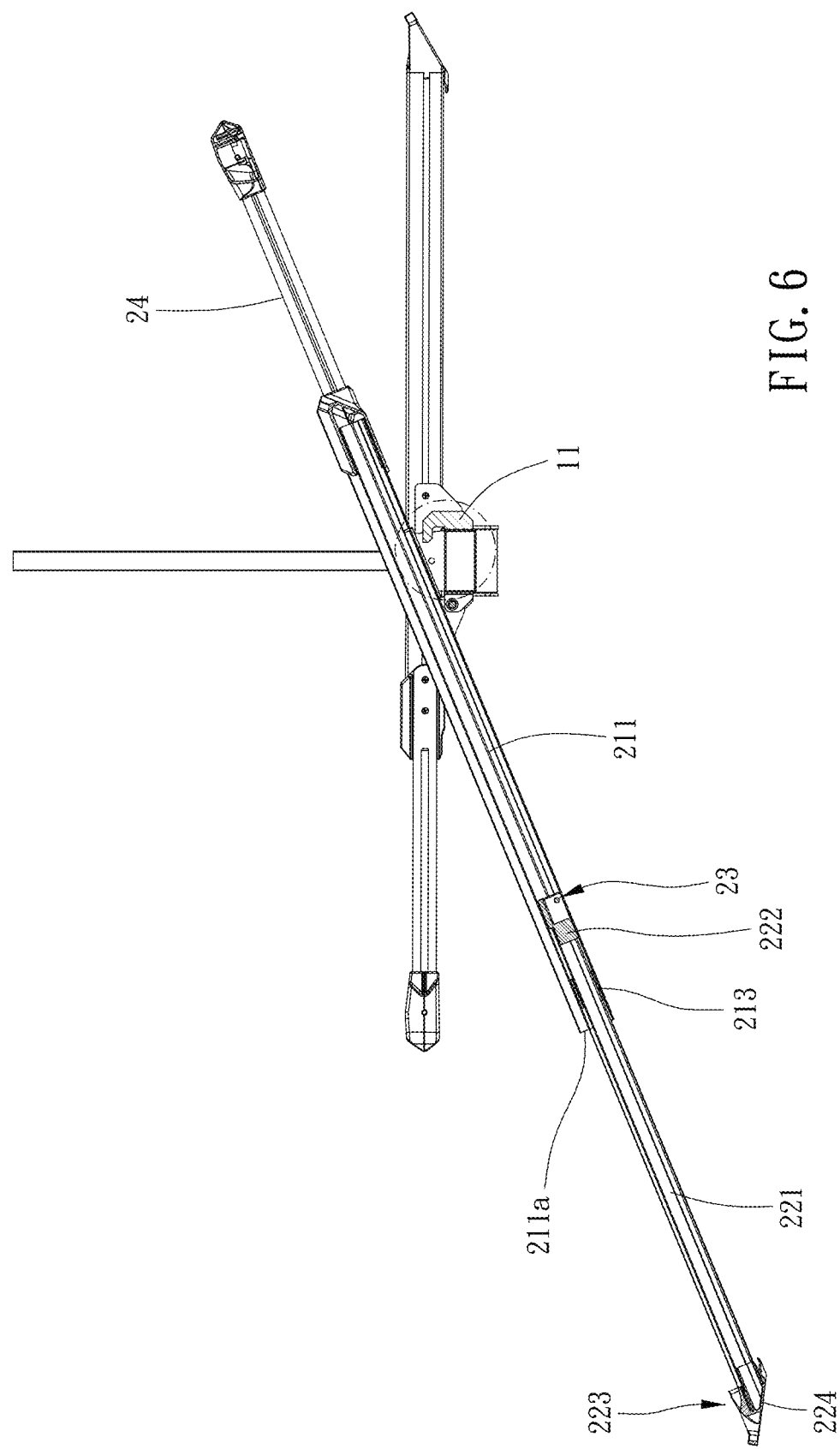
Figure 7:
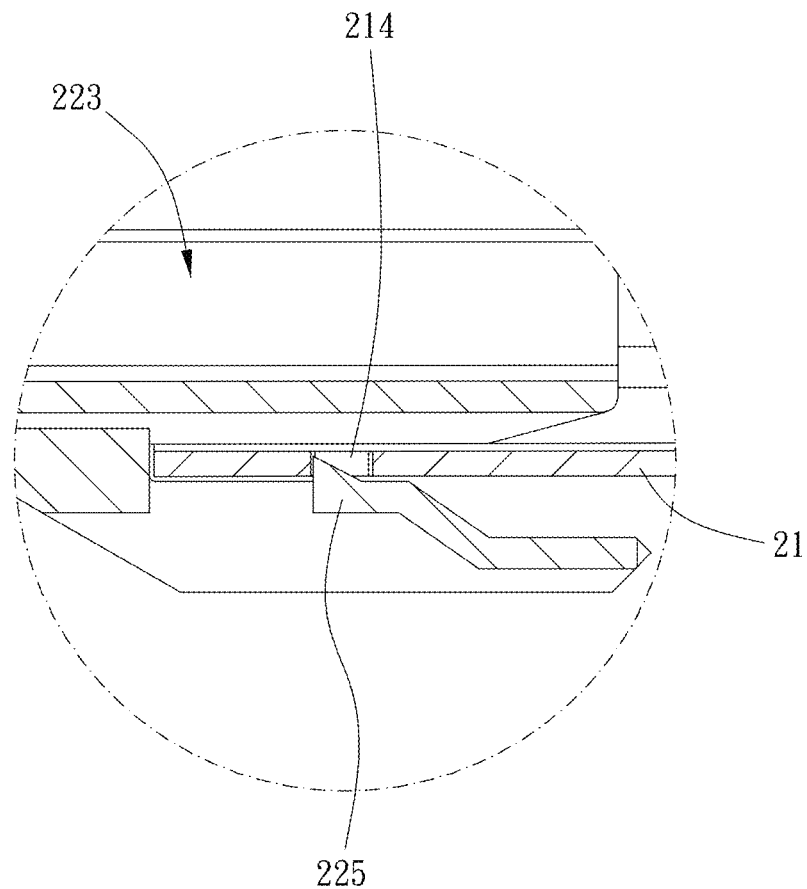
FIG. 7 is an enlargement of the area A of FIG. 5.

The hanging assembly 10 is configured to be detachably connected with a hanging mechanism of a mobile and includes a first engaging portion 11. The at least one carrying assembly 20 is rotatably and transversely disposed on the hanging assembly 10. Each of the at least one carrying assembly 20 includes a frame 21 configured for a vehicle to be disposed thereon, a movable rod 22 and a second engaging portion 23 connected with the movable rod 22. The movable rod 22 is movable in a longitudinal direction of the frame 21 to drive the second engaging portion 23 to move relative to the first engaging portion 11 between a locking position and a release position. When the second engaging portion 23 is in the locking position, the frame 21 is in a carrying position and is non-swingable relative to the hanging assembly 10, which is convenient to storage and carry, as shown in FIGS. 1 and 5. When the movable rod 22 is axially moved relative to the frame 21 and drives the second engaging portion 23 to move to the release position, the frame 21 is swingable relative to the hanging assembly 10 to an inclined position, as shown in FIGS. 2 and 6. Therefore, the vehicle can be pushed onto or off the frame 21, which is easy to operate and laborsaving.

The frame 21 includes a receiving groove 211 extending in the longitudinal direction, and the receiving groove 211 has an opening 211a located at an end of the frame 21. The movable rod 22 is slidably and non-swingably disposed within the receiving groove 211 so that the movable rod 22 is linearly arranged with the frame 21 for easy movement of the vehicle. In this embodiment, the frame 21 is a tubular member which is enclosed circumferentially, which provides advantages of light weight, good structural strength and protection of components disposed therein and prevents external objects from entering the receiving groove 211 for smooth operation. The frame 210 further includes a holding surface 212 configured for the vehicle to be disposed thereon. The holding surface 212 includes an arcuate concave surface 212a concave toward the receiving groove 211 and two inclined surfaces 212b located at two opposite sides of the arcuate concave surface 212a, and each of the two inclined surfaces 212b extends obliquely from the arcuate concave surface 212a in a direction remote from a bottom side of the frame 210. Therefore, wheels of the vehicle are stably restricted and not easy to dislocate from the holding surface 212 during transport. Preferably, the at least one carrying assembly 20 further includes a wheel frame 24, and the wheel frame 24 is connected to an end of the frame 21 remote from the movable rod 22 so as to provide stable engagement with the wheels and good restriction effect.

Please refer to FIGS. 3 to 6, the movable rod 22 includes a rail 221 and a sliding seat 222 connected with the rail 221, and the sliding seat 222 is received within the receiving groove 211 and has the second engaging portion 23 disposed thereon. An end of the frame 21 near the opening 211a has at least one blocking member 213, and the at least one blocking member 213 is blockable with the sliding seat 222 in the longitudinal direction to prevent the rail 221 from departing from the receiving groove 211. In this embodiment, sectional profiles of the rail 221 and the sliding seat 222 correspond to a sectional profile of the receiving groove 211 so that the movable rod 22 is stably and smoothly movable in the receiving groove 211. The rail 221 is integrally formed by bending a plate for good structural strength and lightweight. A diametrical dimension of the sliding seat 222 is larger than a diametrical dimension of the rail 221 so that the at least one blocking member 213 is effectively blockable with the sliding seat 222 and allows smooth movement of the rail 221.

Figure 8:
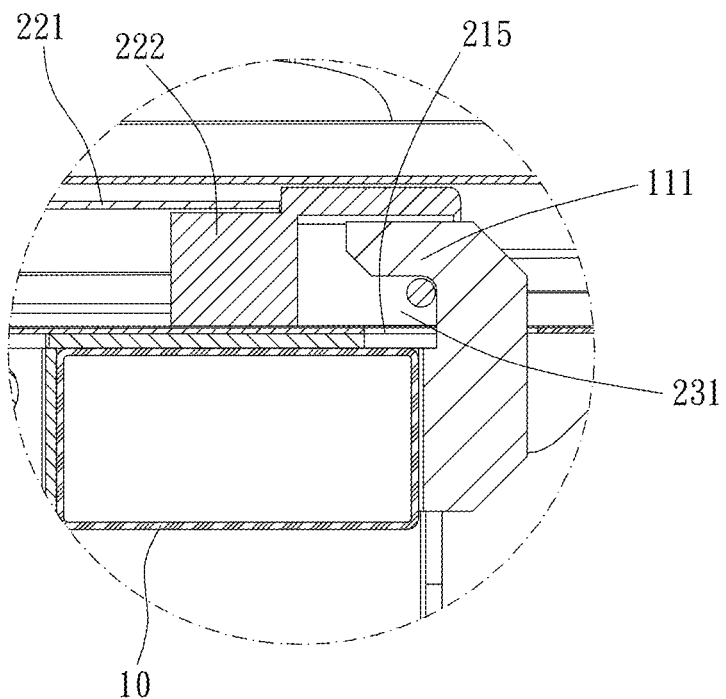
FIG. 8 is an enlargement of the area B of FIG. 5.
Figure 9:
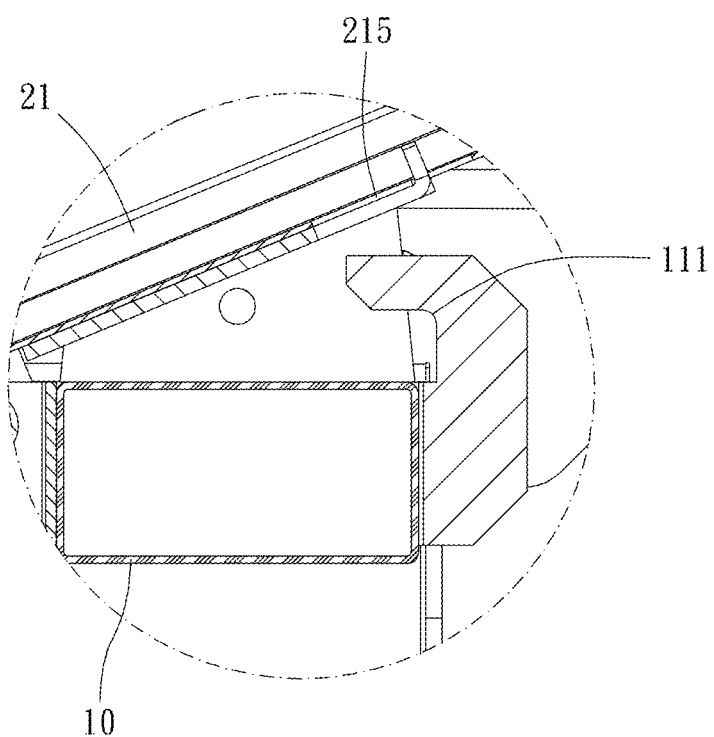
FIG. 9 is a partial enlargement of FIG. 6.

One of the first engaging portion 11 and the second engaging portion 23 includes at least one projection 111, and the other of the first engaging portion 11 and the second engaging portion 23 includes at least one recession 231 corresponding to the at least one projection 111. Each said recession 231 is open in the longitudinal direction so as to be engaged with or disengaged from one said projection 111 by co-movement with the movable rod 22. The frame 21 includes at least one penetrating groove 215 corresponding to the first engaging portion 11, and at least one of the first engaging portion 11 and the second engaging portion 23 is penetrable through the at least one penetrating groove 215. In this embodiment, the first engaging portion 11 includes two said projections 111 which are hook-shaped, and the second engaging portion 23 includes two said recessions 231 which correspond to the two said projections 111 and are disposed on the sliding seat 222. When the frame 21 is in the carrying position, the two said projections 111 penetrate through the at least one penetrating groove 215 and are interferingly engaged within the two said recessions 231 in a rotation direction of the frame 21, as shown in FIG. 8. When the movable rod 22 drives the sliding seat 222 to move in a direction away from the first engaging portion 11, the two said recessions 231 are moved away from the two said projections 111 to be free of interference with one another, and the frame 21 can be departed from the two said projections 111 through the at least one penetrating groove 215 and swung relative to the hanging assembly 10, as shown in FIG. 9, which provides a simple structural strength, easy processing and stable restriction. However, numbers and configurations of said projections and said recessions may be changed according to different requirements.

Preferably, the movable rod 22 further includes an abutting seat 223, and the abutting seat 223 is connected with an end of the rail 221 remote from the second engaging portion 23 and includes an abutting surface 224 tilted to the longitudinal direction. When the frame 21 is in the inclined position, the rail 221 is at least partially departed from the receiving groove 211, and the abutting surface 224 is configured to be abutted against a setting surface (such as the ground) so that the rail 221 can be stably abutted against the setting surface for good operation safety. Please refer to FIG. 7, in this embodiment, the end of the frame 21 near the opening 211a preferably has at least one engaging slot 214 disposed thereon, and the abutting seat 223 further includes at least one engaging protrusion 225 corresponding to the at least one engaging slot 214. When the second engaging portion 23 is in the locking position, the at least one engaging protrusion 225 is releasably engaged with the at least one engaging slot 214, which prevents the movable rod 22 from unexpectedly departing from the receiving groove 211 during transportation. The abutting seat 223 further includes a handling portion 226 which is convenient to move the movable rod 22. However, the frame may have the at least one engaging protrusion, and the abutting seat may have the at least one engaging slot.

The vehicle carrier further includes at least one swing mechanism 30 connected between the hanging assembly 10 and the at least one carrying assembly 20. The at least one swing mechanism 30 includes a pivot 31 disposed on the hanging assembly 10 and a connecting member 32 rotatably connected to the pivot 31, and the frame 21 is connected with the connecting member 32. Specifically, the pivot 31 is located at a side of the hanging assembly 10 near the movable rod 22 and opposite to the first engaging portion 11, which provides good stability when the frame 21 is in the carrying position. Moreover, when the movable rod 22 drives the second engaging portion 23 to move to the release position, the movable rod 22 is moved away from the first engaging portion 11, and a center of gravity of the said carrying assembly 20 is shifted to the side of the hanging assembly 10 near the movable rod 22, which allows the at least one carrying assembly 20 to automatically swing to the inclined position and is laborsaving.

Figure 4:
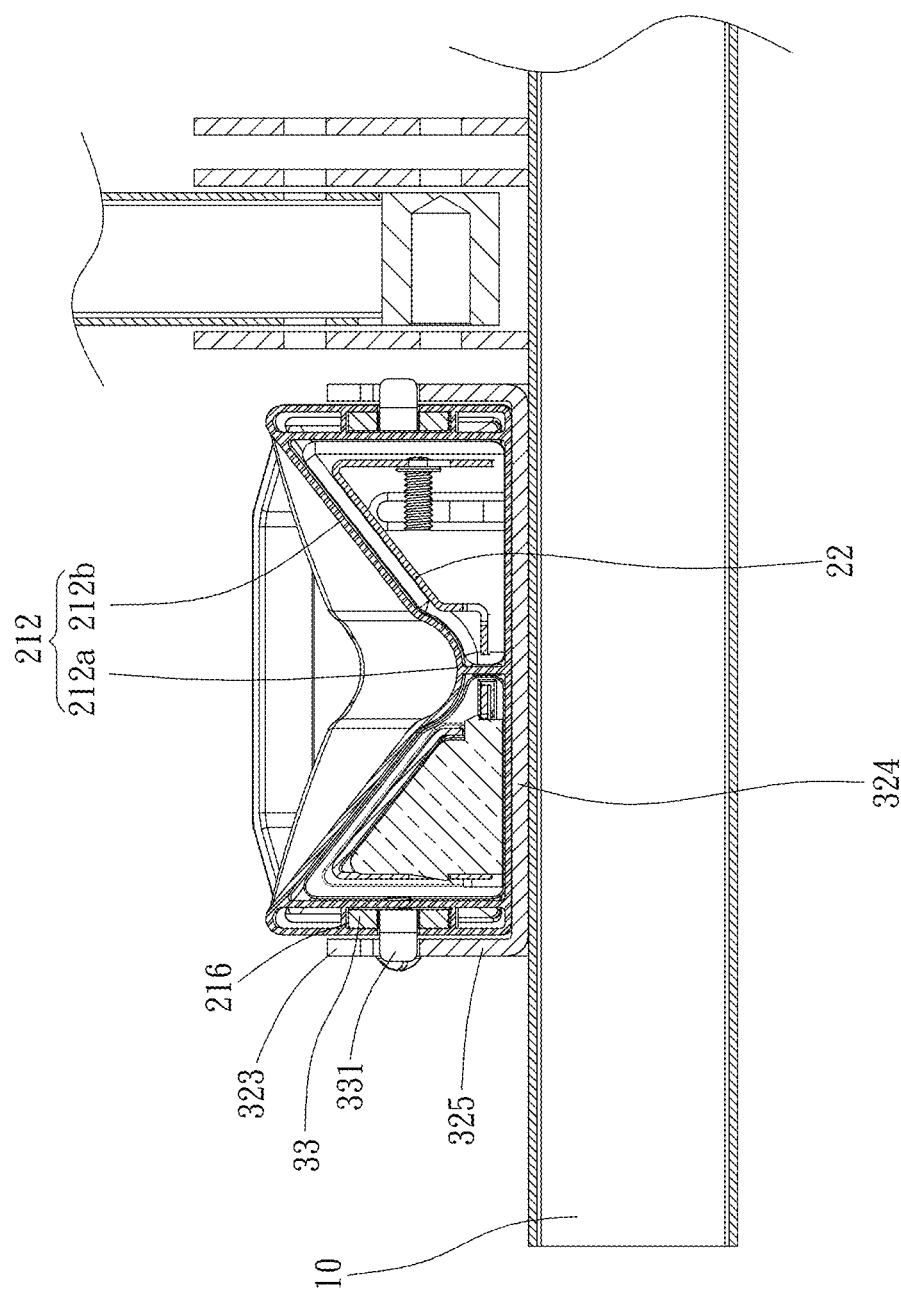
FIG. 4 is a partial cross-sectional view taken along line A-A of FIG. 1.

Preferably, the at least one swing mechanism 30 further includes at least one adjusting member 33. The frame 21 includes at least one sliding groove 216 extending in the longitudinal direction, and the at least one adjusting member 33 is slidably positioned within the at least one sliding groove 216 and immovably connected with the connecting member 32. Therefore, a position of the at least one carrying assembly 20 relative to the pivot 31 is changeable by the adjusting member 33 according to weight or length of the at least one carrying assembly 20 so as to meet various requirements. Moreover, the connecting member 32 includes a pivoting portion 321 connected with the pivot 31 and an assembling portion 322 connected to a side of the pivoting portion 321, and the assembling portion 322 has at least one first blocking portion 323. Each of the at least one adjusting member 33 has a second blocking portion 331 blocked with one said first blocking portion 323 in the longitudinal direction. In this embodiment, two opposite sides of the frame 21 respectively have one said sliding groove 216 and one said adjusting member 33 slidably disposed within the said sliding groove 216. Each of the at least one first blocking portion 323 is a concave groove, and the second blocking portion 331 of each said adjusting member 33 includes two convex blocks which are abutted against two opposite sidewalls of the concave groove, which has a simple structure and stable restriction. The assembling portion 322 includes a first portion 324 and two second portions 325 laterally connected to two opposite sides of the first portion 324, and the first portion 324 faces the bottom side of the frame 21. When the frame 21 is in the carrying position, the first portion 324 is abutted against the hanging assembly 10 (as shown in FIG. 4). The two second portions 325 are respectively connected with one said adjusting member 33 so as to have good structural strength and assembling stability.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A vehicle carrier, including:
   a hanging assembly, configured to be detachably connected with a hanging mechanism of a mobile, the hanging assembly including a first engaging portion; and
   at least one carrying assembly, rotatably and transversely disposed on the hanging assembly, including a frame configured for a vehicle to be disposed thereon, a movable rod and a second engaging portion connected with the movable rod, the movable rod being movable in a longitudinal direction of the frame to drive the second engaging portion to move relative to the first engaging portion between a locking position and a release position;
   wherein when the second engaging portion is in the locking position, the frame is in a carrying position and is non-swingable relative to the hanging assembly; when the movable rod is axially moved relative to the frame and drives the second engaging portion to move to the release position, the frame is swingable relative to the hanging assembly to an inclined position;
   wherein the frame includes at least one penetrating groove corresponding to the first engaging portion, and at least one of the first engaging portion and the second engaging portion is penetrable through the at least one penetrating groove.

2. The vehicle carrier of claim 1, wherein the frame includes a receiving groove extending in the longitudinal direction, the receiving groove has an opening located at an end of the frame, and the movable rod is slidably and non-swingably disposed within the receiving groove.

3. The vehicle carrier of claim 2, wherein the movable rod includes a rail and a sliding seat connected with the rail, the sliding seat is received within the receiving groove and has the second engaging portion disposed thereon, an end of the frame near the opening has at least one blocking member, and the at least one blocking member is blockable with the sliding seat in the longitudinal direction.

4. The vehicle carrier of claim 3, wherein one of the first engaging portion and the second engaging portion includes at least one projection, the other of the first engaging portion and the second engaging portion includes at least one recession corresponding to the at least one projection, and each said recession is open in the longitudinal direction; the movable rod further includes an abutting seat, the abutting seat is connected with an end of the rail remote from the second engaging portion and includes an abutting surface tilted to the longitudinal direction; and when the frame is in the inclined position, the rail is at least partially departed from the receiving groove, and the abutting surface is configured to be abutted against a setting surface; an end of the frame near the opening has at least one engaging slot, the abutting seat further includes at least one engaging protrusion corresponding to the at least one engaging slot, when the second engaging portion is in the locking position, the at least one engaging protrusion is releasably engaged with the at least one engaging slot; the abutting seat further includes a handling portion; the vehicle carrier further includes at least one swing mechanism connected between the hanging assembly and the at least one carrying assembly, the at least one swing mechanism includes a pivot disposed on the hanging assembly and a connecting member rotatably connected to the pivot, and the frame is connected with the connecting member; the at least one swing mechanism further includes at least one adjusting member, the frame includes at least one sliding groove extending in the longitudinal direction, and the at least one adjusting member is slidably positioned within the at least one sliding groove and immovably connected with the connecting member; the connecting member includes a pivoting portion connected with the pivot and an assembling portion connected to a side of the pivoting portion, the assembling portion has at least one first blocking portion, and each of the at least one adjusting member has a second blocking portion blocked with one said first blocking portion in the longitudinal direction; the assembling portion includes a first portion and two second portions which are laterally connected to two opposite sides of the first portion, the first portion faces a bottom side of the frame, the two second portions are respectively connected with one said adjusting member; when the frame is in the carrying position, the first portion is abutted against the hanging assembly; the pivot is located at a side of the hanging assembly near the movable rod and opposite to the first engaging portion; the frame is a tubular member which is enclosed circumferentially; the rail is integrally formed by bending a plate; the frame further includes a holding surface configured for the vehicle to be disposed thereon, the holding surface includes an arcuate concave surface concave toward the receiving groove and two inclined surfaces located at two opposite sides of the arcuate concave surface, and each of the two inclined surfaces extends obliquely from the arcuate concave surface in a direction remote from the bottom side of the frame; and the at least one carrying assembly further includes a wheel frame, and the wheel frame is connected with an end of the frame remote from the movable rod.

5. The vehicle carrier of claim 2, wherein the movable rod includes a rail and an abutting seat, the abutting seat is connected with an end of the rail remote from the second engaging portion and includes an abutting surface tilted to the longitudinal direction; and when the frame is in the inclined position, the rail is at least partially departed from the receiving groove, and the abutting surface is configured to be abutted against a setting surface.

6. The vehicle carrier of claim 1, wherein one of the first engaging portion and the second engaging portion includes at least one projection, the other of the first engaging portion and the second engaging portion includes at least one recession corresponding to the at least one projection, and each said recession is open in the longitudinal direction.

7. The vehicle carrier of claim 1, further including at least one swing mechanism connected between the hanging assembly and the at least one carrying assembly, wherein the at least one swing mechanism includes a pivot disposed on the hanging assembly and a connecting member rotatably connected to the pivot, and the frame is connected with the connecting member.

8. The vehicle carrier of claim 7, wherein the at least one swing mechanism further includes at least one adjusting member, the frame includes at least one sliding groove extending in the longitudinal direction, and the at least one adjusting member is slidably positioned within the at least one sliding groove and immovably connected with the connecting member.

9. The vehicle carrier of claim 8, wherein the connecting member includes a pivoting portion connected with the pivot and an assembling portion connected to a side of the pivoting portion, the assembling portion has at least one first blocking portion, and each of the at least one adjusting member has a second blocking portion blocked with one said first blocking portion in the longitudinal direction.

\* \* \* \* \*